(12) United States Patent
Mizoguchi et al.

(10) Patent No.: US 9,797,497 B2
(45) Date of Patent: Oct. 24, 2017

(54) STRAIN WAVE GEARING

(71) Applicant: HARMONIC DRIVE SYSTEMS INC., Shinagawa-ku, Tokyo (JP)

(72) Inventors: Yoshitomo Mizoguchi, Azumino (JP); Yoshihide Kiyosawa, Azumino (JP)

(73) Assignee: HARMONIC DRIVE SYSTEMS INC., Shinagawa-Ku, Tokyo (JP)

( * ) Notice: Subject to any disclaimer, the term of this patent is extended or adjusted under 35 U.S.C. 154(b) by 3 days.

(21) Appl. No.: 14/906,861

(22) PCT Filed: Jul. 25, 2013

(86) PCT No.: PCT/JP2013/070245
§ 371 (c)(1),
(2) Date: Jan. 21, 2016

(87) PCT Pub. No.: WO2015/011820
PCT Pub. Date: Jan. 29, 2015

(65) Prior Publication Data
US 2016/0160985 A1 Jun. 9, 2016

(51) Int. Cl.
*F16H 49/00* (2006.01)
(52) U.S. Cl.
CPC ................. *F16H 49/001* (2013.01)
(58) Field of Classification Search
CPC .................................... F16H 49/001
USPC ........................................ 74/640
See application file for complete search history.

(56) References Cited

U.S. PATENT DOCUMENTS

| 5,918,508 A | 7/1999 | Ishikawa |
| 7,673,598 B2 * | 3/2010 | Schaefer .................. F01L 1/34 123/90.15 |
| 2008/0210182 A1 | 9/2008 | Schaefer et al. |

FOREIGN PATENT DOCUMENTS

| EP | 2 184 514 A1 | 5/2010 |
| JP | 3-4054 A | 1/1991 |
| JP | 9-166186 A | 6/1997 |
| JP | 2007-205450 A | 8/2007 |
| JP | 2007-527968 A | 10/2007 |
| JP | 2008-180259 A | 8/2008 |
| JP | 2008-240876 A | 10/2008 |
| JP | 2011-190826 A | 9/2011 |

OTHER PUBLICATIONS

International Search Report (PCT/ISA/210) dated Oct. 29, 2013, by the Japanese Patent Office as the International Searching Authority for International Application No. PCT/JP2013/070245.

* cited by examiner

*Primary Examiner* — William C Joyce
(74) *Attorney, Agent, or Firm* — Buchanan Ingersoll & Rooney PC

(57) ABSTRACT

A flat strain wave gearing device equipped with: a first internal gear and a second internal gear; a flexible tubular external gear; and an elliptically shaped wave generator. In the direction of a central axis, the center of support of the external teeth by the wave generator is offset, by an offset amount of Δ along the direction of the central axis, with respect to the tooth-width center of the external teeth of the external gear. By setting the offset direction and the offset amount appropriately it is possible to achieve a strain wave gearing device which is suitable in terms of the operating conditions and the mechanical characteristics of the first and second internal gears.

4 Claims, 4 Drawing Sheets

STRAIN WAVE GEARING

TECHNICAL FIELD

The present invention relates to a strain wave gearing referred to as a flat strain wave gearing, comprising a cylindrical externally toothed gear capable of flexing into a non-circular shape.

BACKGROUND ART

A flat strain wave gearing comprises first and second internally toothed gears arranged in parallel, a cylindrical externally toothed gear arranged therein, and a wave generator arranged inside the externally toothed gear. Typically, the first internally toothed gear is a stationary-side internally toothed gear fixed so as not to rotate, and has more teeth than does the second internally toothed gear. The second internally toothed gear has the same number of teeth as does the externally toothed gear, and is a drive-side internally toothed gear capable of rotating integrally with the externally toothed gear. The externally toothed gear is flexed into a non-circular shape by the wave generator, the externally toothed gear partially meshing with the first and second rigid internally toothed gears.

When the wave generator is caused by a motor or the like to rotate at high speed, the positions at which the externally toothed gear meshes with the first and second internally toothed gears move in the circumferential direction. Relative rotation is generated between the first internally toothed gear and the externally toothed gear according to the difference in the number of teeth. Because the first internally toothed gear is fixed so as not to rotate, the externally toothed gear rotates. The rotation of the externally toothed gear is delivered from the second internally toothed gear rotating integrally with the externally toothed gear, and is transmitted to a load-side member.

Patent Documents 1 and 2 disclose flat strain wave gearings in which ball bearings comprising flexible inner and outer races are used as wave generators. Patent Document 3 discloses a flat strain wave gearing in which a needle roller bearing comprising flexible inner and outer races is used as a wave generator. Patent Document 4 discloses a flat strain wave gearing comprising a wave generator that comprises a pair of rollers.

PRIOR ART DOCUMENTS

Patent Documents

Patent Document 1: JP 2008-240876 A
Patent Document 2: JP 2008-180259 A
Patent Document 3: JP 2011-190826 A
Patent Document 4: JP 2007-205450 A

SUMMARY OF THE INVENTION

Problems to be Solved by the Invention

Conventional flat strain wave gearings are configured so as to satisfy the following conditions A1-A4, as described in Patent Documents 1-4. A description shall be given with reference to FIG. 4.

Condition A1: A stationary-side first internally toothed gear 102 and a drive-side second internally toothed gear 103 comprise teeth having the same width.

Condition A2: An externally toothed gear 104 comprises teeth approximately twice as wide as those of each of the first and second internally toothed gears 102, 103.

Condition A3: The first and second internally toothed gears 102, 103 are arranged so as to be bilaterally symmetrical about an orthogonal plane PL that is orthogonal to a center axis line 100a of a strain wave gearing 100 and passes through the tooth-width center P1 (middle position with respect to the tooth-width direction) of the externally toothed gear 104. Specifically, a middle position P3 between the first and second internally toothed gears 102, 103 coincides with the tooth-width center P1 of the externally toothed gear 104.

Condition A4: A wave generator 105 is arranged so as to be bilaterally symmetrical about the orthogonal plane PL. Specifically, a center P2 of the external teeth (ball center) where support is provided by the wave generator 105 coincides with the tooth-width center P1 of the externally toothed gear 104.

No attention has yet been directed towards altering the above conditions in flat strain wave gearings. However, the inventors discovered that the conventional configuration satisfying the conditions A1-A4 described above is not always optimal in consideration of the mechanical properties of the first internally toothed gear, the mechanical properties of the second internally toothed gear, the operating conditions of the flat strain wave gearing, and other factors. For example, arranging the components such that the middle position between the first and second internally toothed gears coincides with the tooth-width-direction middle position of the externally toothed gear, and such that the ball center of the wave generator coincides with the tooth-width-direction center position as well, is not always optimal.

In light of the above, an object of the present invention is to provide a flat strain wave gearing configured on the basis of conditions different from those used in the prior art.

Means to Solve the Problems

A description shall be given with reference to FIGS. 1(a) and 1(b). The strain wave gearing (1, 1A) of the present invention is characterized in comprising:

a first internally toothed gear (2, 2A) and a second internally toothed gear (3, 3A) that are arranged in parallel in the direction of a center axis line (1a);

a cylindrical flexible externally toothed gear (4) arranged inside the first and second internally toothed gears (2, 3), the flexible externally toothed gear (4) being capable of meshing with each of the first and second internally toothed gears (2, 3); and a wave generator (5) arranged inside the externally toothed gear (4), the wave generator (5) causing the externally toothed gear (4) to radially flex and partially mesh with each of the first and second internally toothed gears (2, 3); wherein external teeth (4a) of the externally toothed gear (4) are wide enough to be capable of meshing with internal teeth (2a, 3a) (2b, 3b) of both of the first and second internally toothed gears (2, 3) (2A, 3A), the meshing occurring across the entire tooth-width direction of the internal teeth (2a, 3a) (2b, 3b);

the wave generator (5) has an external-tooth support surface (5a) that comes into contact with the inner-peripheral surface of the externally toothed gear (4) and causes the externally toothed gear to radially flex into a non-circular shape;

and, when the center position of the external-tooth support surface (5a) in the direction of the center axis line (1a) is defined as a support center (P2), and the middle position of the external teeth (4a) in the tooth-width direction is defined as a tooth-width center (P1), the support center (P2) is set to a position offset toward the first internally toothed gear (2) or toward the second internally toothed gear (3), along the direction of the center axis line (1a), with respect to the tooth-width center (P1).

FIGS. 1(a) and 1(b) are referenced in order to facilitate understanding of the present invention; these drawings in no way limit the present invention to the configuration shown therein.

In the present invention, as shown in FIG. 1(a), when the tooth width (W2) of the first internally toothed gear (2) and the tooth width (W3) of the second internally toothed gear (3) are the same, the first and second internally toothed gears (2, 3) are arranged at symmetrical positions about an orthogonal plane (PL) that is orthogonal to the center axis line (1a) and passes through the tooth-width center (P1).

For example, in a case in which the first internally toothed gear (2) is defined as a stationary-side internally toothed gear fixed so as not to rotate and the second internally toothed gear (3) is defined as a drive-side internally toothed gear from which reduced rotation is outputted, when the support center (P2) is offset toward the drive-side internally toothed gear (3) with respect to the tooth-width center (P1) of the external teeth, an effect is achieved for reducing tooth face abrasion produced by relative rotation between the stationary-side internally toothed gear (2) and the externally toothed gear (4). Conversely, when the support center (P2) is offset toward the stationary-side internally toothed gear (2) with respect to the tooth-width center (P1), an effect is achieved for increasing ratcheting torque.

In the present invention, as shown in FIG. 1(b), when the tooth width (W2A) of the first internally toothed gear (2A) and the tooth width (W3A) of the second internally toothed gear (3A) are different, the first internally toothed gear (2A) is positioned toward one end in the direction of the center axis line (1a) and the second internally toothed gear (3A) is positioned toward the other end about an orthogonal plane (PL) that is orthogonal to the center axis line (1a) and passes through the support center (P2).

The amount of offset (Δ) of the support center (P2) with respect to the tooth-width center (P1) is preferably set to a value within a range of 1-4% of the pitch diameter of the externally toothed gear (4). The amount of offset (Δ) is set to the amount that is optimal for the specific operating conditions and the like. When the amount of offset (Δ) increases, there is a high probability that the mechanical strength of the internally toothed gear further from the support center (P2) will be significantly reduced. Accordingly, in practical application, the amount of offset (Δ) may be set to a value within the range of 1-4% of the pitch diameter of the externally toothed gear (4).

The wave generator (5) typically comprises a wave plug (6) and a wave bearing (7) fitted to the outer-peripheral surface of the wave plug (6), as shown in FIG. 1. The wave bearing (7) comprises a radially flexible outer race (8), the outer-peripheral surface of the outer race (8) being the external-tooth support surface (5a). In this case, the support center (P2) is positioned midway, with respect to the center axis line (1a), on a rolling body (9) of the wave bearing (7). When the rolling body (9) is a ball, as shown in the drawings, the support center (P2) coincides with the ball center.

Typically, the number of teeth of the first internally toothed gear (2) is a first number of teeth, the number of teeth of the second internally toothed gear (3) is a second number of teeth that is less than the first number of teeth, and the number of teeth of the externally toothed gear (4) is set equal to the second number of teeth.

MODE FOR CARRYING OUT THE INVENTION

Figure 1:
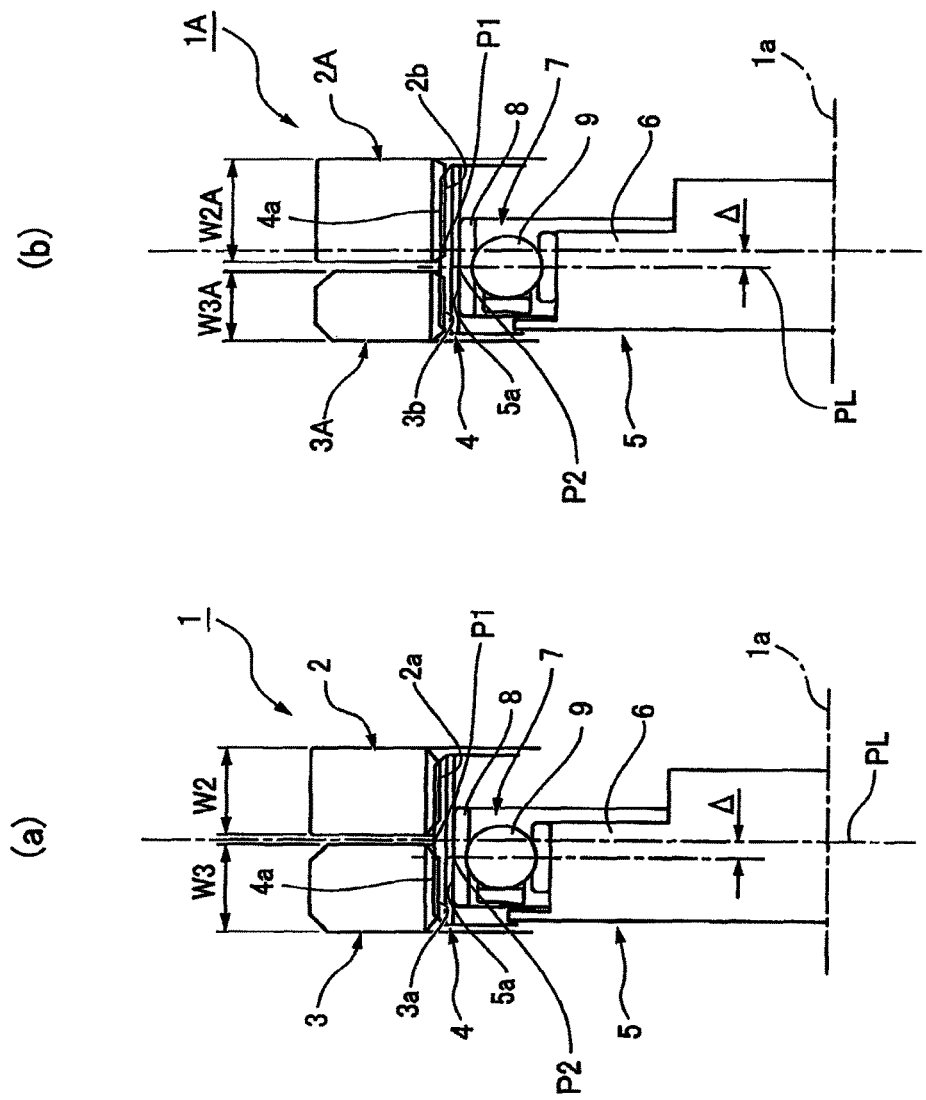
FIGS. 1(a) and 1(b) are schematic drawings of a strain wave gearing of the present invention.

An embodiment of a strain wave gearing to which the present invention is applied shall be described below with reference to the drawings.

FIG. 2(a) is an end view of a strain wave gearing according to one embodiment, and FIG. 2(b) is a longitudinal cross-sectional view of the same. The strain wave gearing 10 comprises a first internally toothed gear 12 and a second internally toothed gear 13 arranged in parallel in the direction of a center axis line 10a. A radially flexible cylindrical externally toothed gear 14 is arranged coaxially inside the first and second internally toothed gears 12, 13. The externally toothed gear 14 is capable of meshing with each of the first and second internally toothed gears 12, 13. A wave generator 15 is arranged coaxially inside the externally toothed gear 14. The wave generator 15 causes the externally toothed gear 14 to radially flex into a non-circular shape and partially mesh with each of the first and second internally toothed gears 12, 13.

The first internally toothed gear 12 is a stationary-side internally toothed gear fixed to a fixed-side member (not shown), and the second internally toothed gear 13 is a drive-side internally toothed gear from which reduced rotation is outputted. The number of teeth of the stationary-side first internally toothed gear 12 is greater than the number of teeth of the drive-side second internally toothed gear 13. Internal teeth 12a, 13a of the first and second internally toothed gears 12, 13 are of the same width.

External teeth 14a of the externally toothed gear 14 are wide enough to be capable of meshing with the internal teeth 12a, 13a of both of the first and second internally toothed gears 12, 13 across the entire tooth-width direction of the internal teeth 12a, 13a. The first and second internally toothed gears 12, 13 are arranged in parallel with a nominal gap therebetween, and the external teeth 14a are approximately twice as wide as the internal teeth 12a, 13a thereof. The number of teeth of the externally toothed gear 14 is equal to the number of teeth of the drive-side second internally toothed gear 13.

The wave generator 15 comprises an ellipsoidally contoured wave plug 16 of a prescribed thickness, and a wave bearing 17 fitted to the ellipsoidal outer-peripheral surface of the wave plug 16. A boss 16b comprising a shaft hole 16a for attaching a motor shaft (not shown) or the like is formed on the center part of the wave plug 16. The wave bearing 17 comprises an outer race 18a and an inner race 18b that are radially flexible, and a plurality of balls 19 rollably fitted between the outer and inner races 18a, 18b. The ellipsoidally flexed outer-peripheral surface of the outer race 18a is an external-tooth support surface 15a in contact with an inner-peripheral surface 14b of the externally toothed gear 14.

The externally toothed gear 14 is ellipsoidally flexed by the wave generator 15, the externally toothed gear 14 meshing with both of the first and second internally toothed gears 12, 13 at both end positions along the major axis of the ellipsoidal shape. When the wave generator 15 rotates, the positions at which the externally toothed gear 14 meshes with the first and second internally toothed gears 12, 13 move in the circumferential direction. In the present example, the number of teeth of the first internally toothed gear 12 is 2n greater than the number of teeth of the second internally toothed gear 13 and the number of teeth of the externally toothed gear 14 (where n is a positive integer), e.g., 2 greater. When the wave generator 15 rotates once, relative rotation is produced between the first internally toothed gear 12 and the externally toothed gear 14 in accordance with the difference in the number of teeth. Because the first internally toothed gear 12 is a stationary-side internally toothed gear fixed so as not to rotate, the externally toothed gear 14 rotates. The second internally toothed gear 13 meshing with the externally toothed gear 14 has the same number of teeth as the externally toothed gear 14, and therefore rotates integrally with the externally toothed gear 14.

The tooth-width-direction middle position of the external teeth 14a of the externally toothed gear 14 is defined as a tooth-width center P1. The middle position, with respect to the center axis line 10a, on the external-tooth support surface 15a of the wave generator 15 is defined as a support center P2. The support center P2 coincides with the center of the balls 19, which are rolling bodies, in the direction of the center axis line 10a.

In the present example, the center P2 where support is provided by the wave generator 15 is set to a position that is offset toward the stationary-side first internally toothed gear 12, along the direction of the center axis line 10a, with respect to the tooth-width center P1 of the externally toothed gear 14. The amount of offset Δ is set to a value within a range of 1-4% of the pitch diameter of the externally toothed gear 14 in a perfectly circular state prior to ellipsoidal flexing. The first and second internally toothed gears 12, 13 are arranged so as to be bilaterally symmetrical about an orthogonal plane PL that is orthogonal to the center axis line 10a and passes through the tooth-width center P1.

Figure 4:
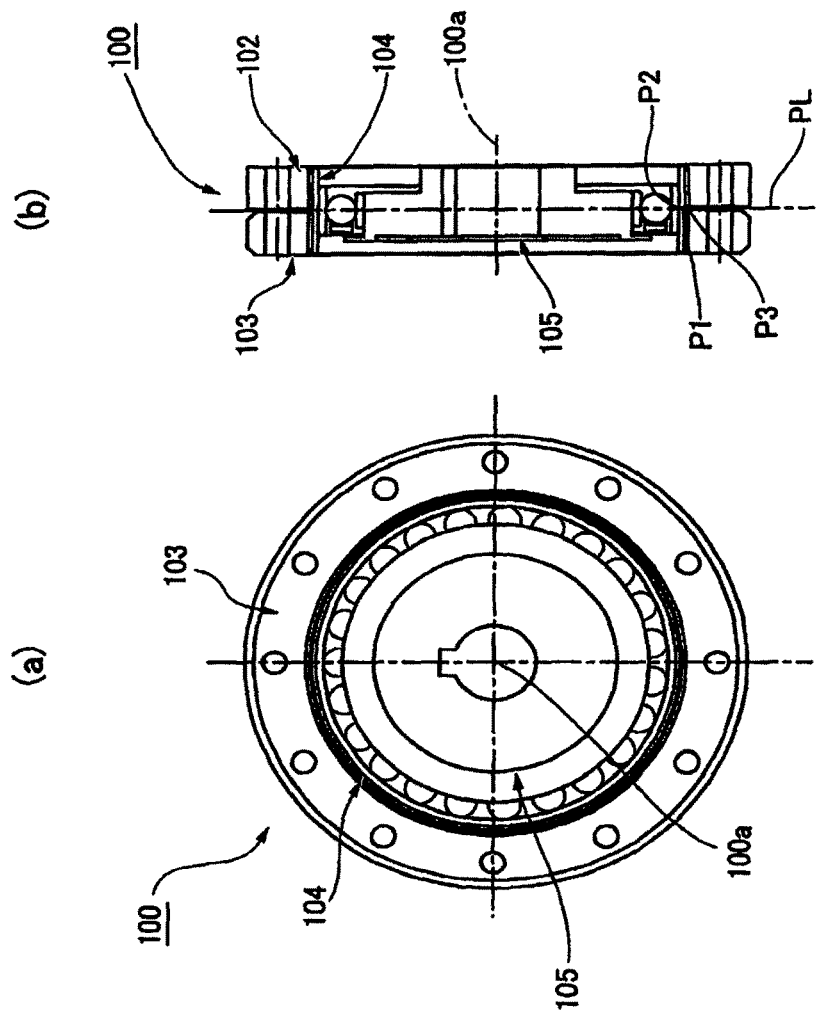
FIG. 4 is an end view and a longitudinal cross-sectional view of a conventional strain wave gearing.

Thus, when the center P2 of the external teeth where support is provided by the wave generator 15 is offset toward the stationary-side first internally toothed gear 12, the ratcheting torque between the internal teeth 13a and the external teeth 14a can be made higher than in a case in which the external-tooth support center P2 and the tooth-width center P1 coincide (see FIG. 4).

Figure 2:
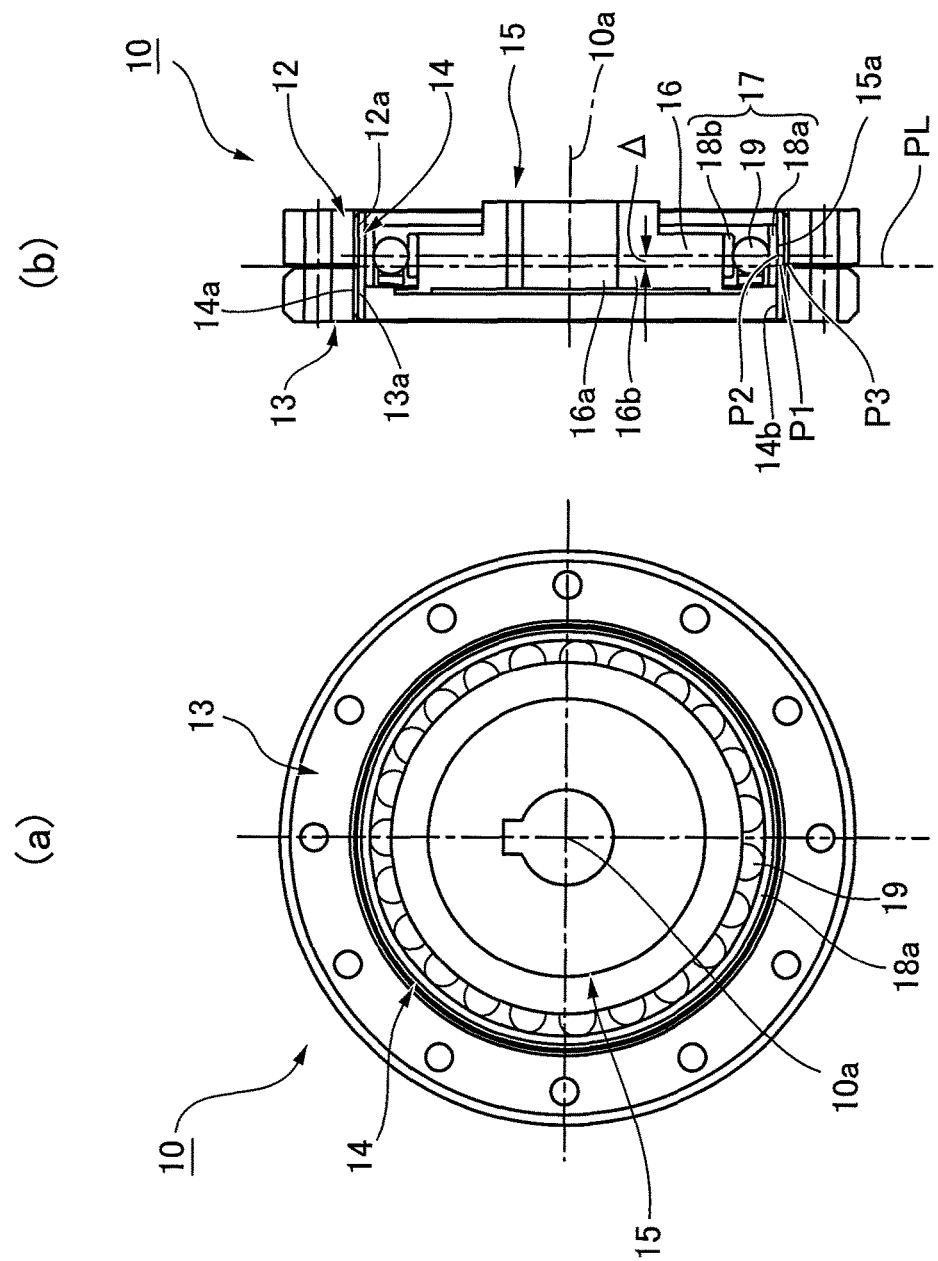
FIGS. 2(a) and 2(b) are an end view and a longitudinal cross-sectional view of a strain wave gearing according to an embodiment to which the present invention is applied.
Figure 3:
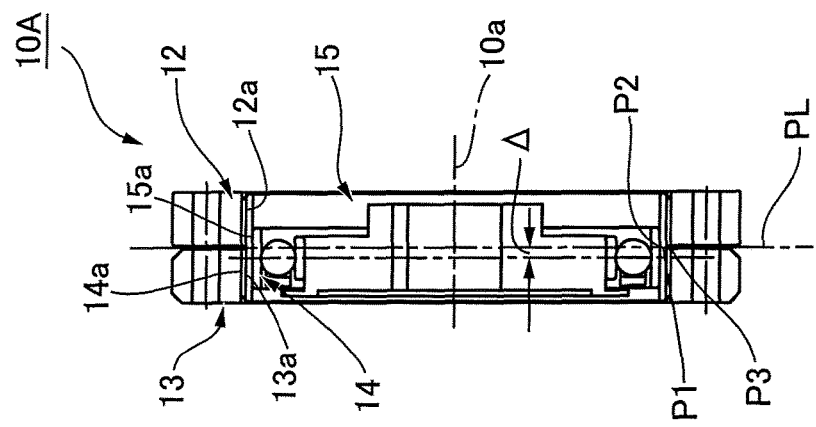
FIG. 3 is a longitudinal cross-sectional view of a modification of the strain wave gearing in FIG. 2.

FIG. 3 is a longitudinal cross-sectional view of an example of a modification of the strain wave gearing 10 in FIG. 2. In the strain wave gearing 10A shown in FIG. 3, the center P2 of the external teeth 14a where support is provided by the wave generator 15 is offset toward the drive-side second internally toothed gear 13, along the direction of the center axis line 10a, with respect to the tooth-width center P1 of the external teeth 14a. When this configuration is adopted, tooth face abrasion caused by meshing of the external teeth 14a with the internal teeth 13a can be minimized to a greater extent than in a case in which the external-tooth support center P2 and the tooth-width center P1 coincide (see FIG. 4).

Other Embodiments

In the embodiment described above, the teeth of the first and second internally toothed gears 12, 13 are of the same width; however, as shown in FIG. 1(b), the present invention can also be applied when the teeth of the first and second internally toothed gears 12, 13 are of different widths. In this case, the width of the external teeth 4a is approximately equal to the sum of the widths of the internal teeth 2b of the first internally toothed gear 2A and the internal teeth 3b of the second internally toothed gear 3A. The first and second internally toothed gears 2A, 3A are arranged on either side of an orthogonal plane PL that passes through the center P2 of the external teeth where support is provided by the wave generator.

Additionally, in the embodiment described above, a ball bearing comprising flexible inner and outer races is used in the wave generator. However, a needle roller bearing comprising flexible inner and outer races can be used instead in the wave generator, as described in Patent Document 3 cited above.

Furthermore, a wave generator comprising a pair of rollers as described in Patent Document 4 cited above, or a wave generator comprising a plurality of pairs of rollers, can also be used as the wave generator.

The invention claimed is:

1. A strain wave gearing, comprising:
 a first internally toothed gear and a second internally toothed gear that are arranged in parallel in a direction of a center axis line;
 a cylindrical flexible externally toothed gear arranged inside the first and second internally toothed gears, the flexible externally toothed gear configured to mesh with each of the first and second internally toothed gears; and
 a wave generator arranged inside the externally toothed gear, the wave generator configured to cause the externally toothed gear to radially flex and partially mesh with each of the first and second internally toothed gears; wherein
 external teeth of the externally toothed gear have a tooth-width configured to mesh with internal teeth of both of the first and second internally toothed gears, the meshing occurring across an entire tooth-width direction of the internal teeth;
 the wave generator has an external-tooth support surface that comes into contact with the inner-peripheral surface of the externally toothed gear and is configured to cause the externally toothed gear to radially flex into a non-circular shape; and
 a center position of the external-tooth support surface in the direction of the center axis line is defined as a support center, and a middle position of the external teeth in a tooth-width direction thereof is defined as a tooth-width center,
 the support center is set to a position offset toward the first internally toothed gear or toward the second internally toothed gear, along the direction of the center axis line, with respect to the tooth-width center;
 wherein the amount of offset of the support center with respect to the tooth-width center is set to a value within a range of 1-4% of a pitch diameter of the externally toothed gear;
 wherein the number of teeth of the first internally toothed gear is a first number of teeth, the number of teeth of the second internally toothed gear is a second number of teeth that is less than the first number of teeth, and the number of teeth of the externally toothed gear is set equal to the second number of teeth, and wherein the first internally toothed pear is a stationary-side internally toothed clear that is fixed not to rotate, and the second internally toothed gear is a drive-side internally toothed gear for outputting a reduced-speed rotation.

2. The strain wave gearing according to claim 1, wherein the tooth width of the first internally toothed gear and the tooth width of the second internally toothed gear are the same, the first and second internally toothed gears are arranged at symmetrical positions about an orthogonal plane that is orthogonal to the center axis line and passes through the tooth-width center.

3. The strain wave gearing according to claim 1, wherein the tooth width of the first internally toothed gear and the tooth width of the second internally toothed gear are different, the first internally toothed gear is positioned toward one end in the direction of the center axis line and the second internally toothed gear is positioned toward the other end about an orthogonal plane that is orthogonal to the center axis line and passes through the support center.

4. The strain wave gearing according to claim 1, wherein the wave generator has a wave plug and a wave bearing fitted to an outer-peripheral surface of the wave plug, the wave bearing has a radially flexible outer race, an outer-peripheral surface of the outer race is the external-tooth support surface, and the support center is positioned midway, along the center axis line, on a rolling body of the wave bearing.

* * * * *